United States Patent Office 3,780,001
Patented Dec. 18, 1973

3,780,001
(HYDROCARBONTHIO)OXAMIDE VULCANIZATION RETARDERS
Pyong-Nae Son, Akron, Ohio, assignor to The B. F. Goodrich Company, New York, N.Y.
No Drawing. Filed Mar. 27, 1972, Ser. No. 238,653
Int. Cl. C08c 9/00, 11/54; C08d 9/00
U.S. Cl. 260—79.5 A
11 Claims

ABSTRACT OF THE DISCLOSURE (Hydrocarbonthio)oxamides are efficient, non-blooming vulcanization retarders. The compounds are prepared by the reaction of oxamide (or oxanilide) with a hydrocarbon sulfenyl chloride.

BACKGROUND OF THE INVENTION

During processing and forming operations, at times a compounded sulfur-vulcanizable polymer stock containing an accelerator will prematurely and undesirably start to cure, a phenomenon known as scorching. The stock gets tough and hard to work, and the cured product has poor appearance and properties. One reason for this is that the vulcanizing agents, particularly the accelerators, are activated too soon. Various alternative solutions are available. Lowering the processing temperature will increase the scorch time but will also increase total processing time, resulting in decreased product output. A less scorchy accelerator system can be used but this also increases the processing time and often leads to less desirable product properties. The problem is made even more complex by the influence that compounding ingredients can have on accelerators. This is particularly true when amine-based antioxidants and antiozonants or high pH carbon blacks are used; all tend to make stocks more scorchy.

Vulcanization retarders are used to delay the action of accelerators, thereby increasing stock scorch safety. However, many of the older well known types such as maleic and salicylic acid, benzoic and phthalic acid, and N-nitrosodiphenyl amine have proven to be only marginally effective with fast-acting accelerators such as mercaptobenzothiazoles and the like. A series of vulcanization retarders are disclosed in U.S. Pats. 3,513,139; 3,539,538; 3,546,185; 3,562,225; and 3,586,696. Unfortunately, some of these compounds bloom (migrate) to the surface of the vulcanizate. One such compound, N-(cyclohexylthio) phthalimide, now marketed commercially blooms when used at levels above 0.5 part per hundred of polymer. This results, in the very least, in undesirable appearance of the cured product. Furthermore, the compound can come off of the surface of the product and contaminate the surroundings. For example, the bloomed compound can come off during immersion and washings thereby contaminating water or oil, or rub off during handling and possibly creating a health hazard, or rub off onto molds and dies and cause corrosion.

SUMMARY OF THE INVENTION (Hydrocarbothio)oxamides of the formula

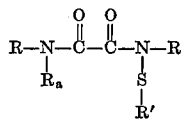

wherein R and $R_a$ are independently hydrogen, an alkyl, aryl, aralkyl, alkaryl, or cycloalkyl radical containing 1 to 18 carbon atoms, or —SR', and R' is a hydrocarbon radical containing 1 to 24 carbon atoms, are highly effective vulcanization retarders for sulfur-vulcanizable polymers containing accelerator compounds. The (hydrocarbonthio)oxamides are as effective as commercial retarders but bloom much less than comparably effectual retarders.

DETAILED DESCRIPTION

The novel compounds are (hydrocarbonthio)oxamides of the formula

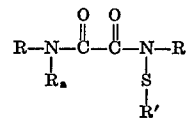

wherein R and $R_a$ are independently hydrogen, an alkyl, aryl, alkaryl, aralkyl or cycloalkyl radical containing 1 to 18 carbon atoms, or —SR', and R' is a hydrocarbon radical containing 1 to 24 carbon atoms. More preferably R' is an alkyl, aryl, aralkyl, alkaryl or cycloalkyl radical containing 1 to 18 carbon atoms. Examples of such radicals are methyl, ethyl, propyl, isopropyl, butyl, isobutyl, hexyl, octyl, isooctyl, 2-ethylhexyl, decyl, dodecyl, t-dodecyl, tetradecyl, octadecyl, and the like; phenyl, naphthyl, anthracyl; tolyl and other aralkyls such as p-ethylphenyl, o-, m-, p-butylphenyl, o-, m-, p-octylphenyl, 6-ethylnaphthyl, and the like; and cyclobutyl, cyclopentyl, cyclohexyl, cyclooctyl, and the like. Furthermore, the R, $R_a$ and R' radicals can contain one or more substituents thereon such as —Cl, —Br, —SO₂, —NO₂, alkoxy and carboxy radicals containing 1 to 8 carbon atoms, and the like. More preferably, the substituents on R are electron-withdrawing groups such as —Cl, —NO₂, and —SO₂, whereas substituents on R' are electron donating groups.

More preferably the (hydrocarbonthio)oxamides are of the formula

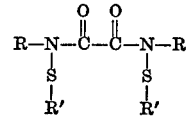

wherein R and R' are defined as above. Examples of such compounds are

N,N'-bis(methylthio)oxamide;
N,N'-bis(ethylthio)-N-butyl-oxamide;
N,N'-bis(hexylthio)-N'-octyl-oxamide;
N,N'-bis(decylthio)-N-isooctyl-oxamide;
N,N'-bis(tetradecylthio)-N-dodecyl-oxamide;
N-ethylthio-N'-hexylthio-oxamide;
N-2-ethylhexylthio-N-butyl-N'-octylthio-oxamide;
N,N'-bis(decylthio)-N,N'-bis(methyl)oxamide;
N,N'-bis(isobutylthio)-N,N'-bis(octyl)-oxamide;
N,N'-bis(phenylthio)oxamide;
N,N'-bis(phenylthio)-N-hexyl-oxamide;
N,N'-di(phenylthio)-N,N'-di(phenyl)oxamide;
N,N'-bis(tolylthio)-N,N'-bis(phenyl)oxamide;
N-phenylthio-N-phenyl-N'-methyl-N'-p-ethylphenylthio-oxamide;
N,N'-bis(benzylthio)-N,N'-bis(butyl)oxamide;
N-naphthylthio-N'-isopropylthio-oxamide;
N,N'-bis(naphthylthio)-N,N'-bis(methyl)oxamide;

N,N'-bis(methylthio)-N,N'-bis(tetradecyl)oxamide;
N-hexylthio-N'-octylthio-N,N'-bis(phenyl)oxamide;
N,N'-bis(isopropylthio)-N,N'-bis(phenyl)oxamide;
N,N'-bis(t-dodecylthio)-N,N'-bis(naphthyl)oxamide;
N,N'-bis(phenylthio)-N,N'-bis(p-nitrophenyl)oxamide;
N-cyclobutylthio-N'-isobutylthio-oxamide;
N,N'-bis(cyclobutylthio)-N'-hexyl-oxamide;
N-cyclopentylthio-N'-cyclohexylthio-N,N'-bis(phenyl) oxamide;
N,N'-bis(cyclohexylthio)oxamide;
N,N'-bis(cyclohexylthio)-N,N'-bis(phenyl)oxamide;
N,N-bis(cyclooctylthio)-N,N'-bis(p-chlorophenyl) oxamide;

and the like.

More practically R is hydrogen or an aryl, aralkyl, or alkaryl radical containing 6 to 14 carbon atoms, and R' is an alkyl or cycloalkyl radical containing 1 to 12 carbon atoms. Examples of such more preferred compounds are N,N'-bis(ethylthio)oxamide;
N-butylthio-N'-hexylthio-oxamide;
N,N'-bis(isopropylthio)-N,N'-bis(phenyl)oxamide;
N,N'-bis(isooctylthio)-N-phenyl-oxamide;
N-decylthio-N'-cyclobutylthio-oxamide;
N,N'-bis(cyclopentylthio)-N,N'-bis(phenyl)oxamide;
N,N'-bis(cyclohexylthio)oxamide;
N,N'-bis(cyclohexylthio)-N,N'-bis(phenyl)oxamide;
N-octylthio-N'-cyclooctylthio-N,N'-bis(naphthyl) oxamide, and the like.

The compounds are prepared by the reaction of a hydrocarbon sulfenyl chloride with oxamide or derivatives thereof. The reaction follows that employed by Behrorouz et al., Journal of Organic Chemistry, vol. 34, page 51 (1969). The hydrocarbon sulfenyl chloride is prepared by reacting a hydrocarbon thiol of the formula R'—SH or a hydrocarbon disulfide of the formula

wherein R' is defined as above, with halide gas, preferably chlorine gas. About 1 mole of halide gas per mole of mercaptan is used, though a molar excess of the halide may be employed. The reaction is usually conducted in a solvent at a temperature from about —20° C. to about 30° C. Typical solvents are alkyl hydrocarbons such as heptane and hexane and halogenated alkyls such as carbon tetrachloride, trichloromethane, methylene chloride, trichloroethane, ethylidene trichloride, and the like. Reaction time is from about 0.2 hour to about 2 hours.

The hydrocarbon sulfenyl chloride is then reacted with an oxamide of the formula

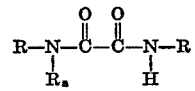

wherein R and $R_a$ are defined as above. Examples of such compounds are oxamide and N-, N,N'- and N,N,N'-derivatives of oxamide such as N-methyl, N-ethyl, N-isopropyl, N-butyl, N-hexyl, N-octyl, N-isooctyl, N-decyl, N-dodecyl, N-tetradecyl, N-phenyl, N-p-nitro-phenyl, N-p-methylphenyl, N-p-butylphenyl, N-naphthyl, N-6-ethylnaphthyl, N-cyclohexyl, and the like; N,N'-di(methyl), N,N' - di(ethyl), N,N' - di(isopropyl), N,N' - di(hexyl), N,N'-di(octyl), N,N'-di(dodecyl), N,N'-di(tetradecyl), N,N'-di(phenyl), N,N'-di(p - nitro - phenyl), N,N'-di(o-, m-, p-chloro-phenyl), N,N'-di(p - ethyl - phenyl), N,N'-di(naphthyl), N,N'-di(6 - ethylnaphthyl), N,N-di(cyclohexyl) and the like; and N-methyl-N'-phenyl, N-hexyl-N'-octyl, N-phenyl-N'-naphthyl, and the like; and N,N-dimethyl-N'-ethyl, N-phenyl-N-methyl-N'-phenyl, and the like. More practically $R_a$ is hydrogen and R is hydrogen or an aryl, aralkyl or alkaryl radical containing 6 to about 14 carbon atoms wherein both R groups are the same. Examples of such are oxamide, N,N'-di(phenyl) oxamide (oxanilide), N,N'-di(4-methyl-phenyl)oxamide, N,N'-di(naphthyl)oxamide, and the like.

The reaction between the hydrocarbon sulfenyl chloride and the oxamide is conducted at a temperature from about —10° C. to about 60° C., and more preferably from about 10° C. to about 40° C. About two moles of the sulfenyl chloride are used per mole of oxamide compound, though an excess of the chloride may be employed. Usually an organic liquid is used to aid the reaction. The liquid can be the same as the solvents used in the halogenation reaction, or it can be an aromatic such as benzene, toluene, and chlorobenzene, or tetrahydrofuran, dioxane, and dimethylformamide. Often a mixture of two liquids is used in the reaction, a solvent for the chlorination and an organic liquid for the product reaction. Preferably tetrahydrofuran or dimethylformamide is used along with an alkyl or halogenated alkyl hydrocarbon.

The reaction can be catalyzed by tertiary amines such as trimethylamine, triethylamine, N,N' - dimethylaniline, and the like, or an organic lithium compound such as n-butyl lithium can be used. Reaction time is from about 1 to about 4 hours. If the (hydrocarbonthio)oxamides are not soluble in the liquid mix, they can be isolated by filtration. The compounds can purified by washing with water and/or recrystallizing them from hexane or benzene. The compounds were characterized by their infrared (IR) and nuclear magnetic resonance (NMR) spectra, their melting point, by carbon, hydrogen, nitrogen, and sulfur analysis (C, H, N, S content), and by their mass spectra to determine molecular weight.

The (hydrocarbonthio) oxamides are employed in the range from about 0.02 part to about 5 parts by weight per hundred parts by weight of polymer. More preferably, they are used in from about 0.1 to about 3 parts by weight. The compounds are highly effective vulcanization retarders, often delaying the onset of cure 200% or more when used at the level of about 1 part by weight. Over the range from 0.5 to 5 parts by weight, they bloom much less than comparably effective retarders.

The (hydrocarbonthio)oxamides are useful vulcanization retarders with a wide range of sulfur and nitrogen-based accelerator compounds. Examples of such accelerators are the metal salts of dialkyl and diaryl dithiocarbamates such as zinc and lead dimethyl dithiocarbamate, zinc, bismuth, cadmium, selenium, and tellurium diethyl dithiocarbamate, sodium dibutyl dithiocarbamate, zinc dibenzyl dithiocarbamate, and the like, and bis-(dimethylthiocarbamyl)sulfide, N-pentamethyleneammonium-N-pentamethylene dithiocarbamate, and the like; benzothiazoles and benzothiazole-sulfenamides such as 2-mercaptobenzothiazole and the zinc salt thereof, 2-(2,6-dimethyl - 4 - morpholinothio)benzothiazole, 2-benzothiazole-4-morpholinyl disulfide, 2,2'-benzothiazyl disulfide, N-diisopropyl - 2 - mercaptobenzothiazole sulfenamide, N-t-butyl-2-benzothiazole sulfenamide, N-cyclohexyl-2-benzothiazole sulfenamide, N-oxydiethylene-2-benzothiazole sulfenamide, and the like; thiuram sulfides such as tetramethylthiuram mono- and di-sulfide, tetraethyl thiuram disulfide, tetrabutyl thiuram monosulfide, and the like; thioureas such as ethylene thiourea, trimethyl thiourea, N,N'-diethyl thiourea, N,N'-dibutyl thiourea, N,N'-diphenyl thiourea, and the like; morpholines such as 4,4'-dithiomorpholine; polyamines such as triethylene diamine, hexamethylene tetraamine, tricretonylidene tetraamine, and the like; amine and aldehyde condensation products such as acetaldehyde-ammonia, butyraldehyde-butylamine, butyraldehyde-aniline, heptaldehyde-aniline, ethylchloride-formaldehyde-ammonia, and the like; imidazolines such as 2-mercaptoimidazoline; and guanidines such as diphenyl guanidine, di-orthotolyl guanidine, and the like.

The accelerators may be used alone or in combination with each other. They are used in levels from about 0.05 to about 7 parts by weight total, and more preferably from about 0.3 to about 5 parts by weight per hundred parts of polymer. Elemental sulfur is typically employed with these accelerators in levels from about 0.1 to about 10 parts by weight per hundred parts of polymer.

The novel vulcanization retarders are used to delay the cure of sulfur-vulcanizable polymers. Usually these polymers are rubbers or elastomers containing about 30% and up to 50% by weight based upon the weight of the polymer of olefinic ($>C=C<$) backbone and/or side-chain unsaturation, although they need not be so limited. Examples of such are natural rubber, cis-polyisoprenes, cis-polybutadienes (CB), trans- (emulsion) polybutadienes, butadiene-acrylonitrile polymers (NBR), isoprene-acrylonitrile, polyisobutylenes, polychloroprenes, styrene-butadiene rubbers (SBR), and styrene-isoprene rubbers. Other useful sulfur-vulcanizable elastomers containing from about 0.05% to about 30% by weight of olefinic unsaturation are readily employed. Examples of such are isoprene-isobutylene (Butyl) rubbers; ethylene-propylene-diene polymer (EPDM) containing from about 0.5% to about 20% by weight of a diene monomer where the diene is conjugated as in butadiene, 1,3-pentadiene, and the like; non-conjugated as in 1,4-pentadiene, 1,4-hexadiene, and the like; cyclic dienes as in cyclopentadiene, dicyclopentadiene, and the like; an alkenyl norbornene such as 5-ethylidene-2-norbornene, 2 - isopropenyl-5-norbornene, and the like; and others such as 3-ethylbicyclonodiene and 3-methyltricyclo-(5,2,1,0$^{2,6}$)-3,8-decadiene; and copolymers of conjugated dienes with over 40% by weight based upon the weight of the polymer of lower alkyl and alkoxy acrylate monomers such as ethyl acrylate, butyl acrylate, methoxyethyl acrylate and the like; and polyether terpolymers containing about 0.5% to about 20% by weight of allyl glycidyl ether or glycidyl acrylate or methacrylate.

The retarders can be used with a full range of compounding ingredients. This includes activators such as metal oxides like zinc, calcium, and magnesium oxide, lead monoxide and dioxide, fatty acids such as stearic and lauric acid, and salts thereof such as cadmium, zinc and copper stearate and lead oleate; fillers such as the carbon blacks like channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders such as dialkyl and diaryl organic acids like diisobutyl, diisooctyl, diisodecyl, and dibenzyl oleates, stearates, sebacates, azelates, phthalates, and the like, ASTM type 2 petroleum oils, ASTM D2226 aromatic, naphthalenic and paraffinic oils, castor oil, tall oil, glycerin, and the like; antioxidants, antioxonants, and stabilizers such as di-β-naphthyl-p-phenylenediamine,
phenyl-β-naphthylamine,
dioctyl-p-phenylenediamine,
N-1,3-dimethylbutyl-N-phenyl-p-phenylenediamine,
4-isopropylamino diphenylamine,
2,6-di-t-butyl paracresol,
2,2'-methylenebis-(4-ethyl-6-t-butylphenoyl),
2,2'-thiobis-(4-methyl-6-t-butyl phenol),
bisphenol-2,2'-methylenebis-6-t-butyl-4-ethylphenol,
4,4'-butylidenebis-(6-t-butyl-m-cresol),
2-(4-hydroxy-3,5-t-butylaniline)-4,6-bis(octylthio)- 1,3,5-triazine,
hexahydro-1,3,5-tris-β-(3,5-di-t-butyl-4-hydroxyphenyl) propionyl-s-triazine,
tris-(3,5-di-t-butyl-4-hydroxybenzyl)isocyanurate,
tetrakismethylene-3-(3',5'-di-t-butyl-4'-hydroxyphenyl) propionate methane,
distearyl thiodipropionate,
dilauryl thiodipropionate,
tri(nonylatedphenyl)phosphite, and the like; and other ingredients such as pigments, tackifiers, flame retardants, fungicides, and the like.

The vulcanization retarders, accelerators, sulfur, and other compounding ingredients are admixed with the polymer using conventional equipment such as two-roll mills and internal mixing equipment such as Banburys, extruders, and Brabender mixers. Standard mixing and addition techniques are employed.

The effectiveness of the retarders can be measured as the increase in scorch time that the compound produces in the stock. Scorch time can be determined by various methods. The standard method is ASTM Procedure D-1646 wherein, using a Mooney Viscometer with a large rotor, a $T_5$ value is determined. This value is the time in minutes for a compounded polymer stock heated at a set temperature to reach a minimum viscosity value and then to rise 5 units over this value. Scorch time can also be determined by using a Monsanto Rheometer and measuring $T_2$, the time in minutes for a stock to advance 2 chart units over minimum. A more preferred method is to use the B.F.G. Cone Curometer described in U.S. Pat. 3,494,172. The stock is placed in a conical cavity and then a ram brought down and oscillated. The resistance to the ram's movement exerted by the stock is displayed as torque versus time (at a set temperature). The time measured is $T_s$, usually as $T_s$, 2 or $T_s$, 3, which is the time in minutes for the torque to rise 2 (or 3) inch-pounds over the minimum torque value. A longer time of $T_s$, 2 indicates increased scorch safety.

Once the stock starts to cure, cure rates using the novel retarders are about as fast as those obtained without using the retarders. The stocks are cured at a temperature range from about 250° F. to about 450° F. The temperature chosen is usually determined by the type of polymer used and the mixing equipment employed. Certain cured properties, i.e., tensile, modulus, and elongation, were measured following ASTM D412. Compression set was measured following ASTM D395B. Cured samples were visually inspected for signs of bloom. The (hydrocarbonthio)oxamides exhibited little bloom, often showing no or very slight bloom at 3 parts by weight or more per hundred of polymer.

The (hydrocarbonthio)oxamides have many practical uses. Their use allows the use of fast-curing accelerators in standard or ordinary processing procedures where otherwise the accelerators would be too scorchy. By delaying the onset of cure, higher processing temperatures may be employed, thereby increasing product output. Stocks which are marginally scorchy can be made less scorchy resulting in less waste. Also, storage capacity of stocks can be greatly improved with the addition of the novel compounds. Further advantages will become apparent to those skilled in the art.

The following examples are set forth to illustrate specific embodiments of the invention. Ingredients used are given in parts by weight unless otherwise indicated.

Example I

N,N'-bis(cyclohexylthio)oxanilide was prepared. First, cyclohexylmercaptan was chlorinated to yield cyclohexylsulfenyl chloride, which was then reacted with oxanilide (N,N'-bis(phenyl)oxamide). Three different procedures were used. The product yields varied as to the catalyst and organic liquid system used. The reactions were conducted in a reactor vessel equipped with means of agitation.

Procedure A.—Cyclohexylmercaptan, 29.1 grams (0.25 mole), and 200 milliliters of anhydrous heptane were added to the reactor vessel. The solution was cooled to —5° C. and 17.7 grams (0.25 mole) of chlorine gas was introduced. After 0.5 hour, nitrogen gas was swept through the solution to remove HCl by-product. The cyclohexyl sulfenyl chloride solution was then added, over a period of 15 minutes, to a slurry of 250 milliliters of anhydrous tetrahydrofuran, 100 milliliters of a solution of 23% by weight n-butyl lithium in hexane, and 30.0 grams (0.125 mole) of oxanilide. Temperature was about 25° C. The reactor mix was stirred overnight (about 10 hours). A white solid was filtered out of the mix and washed with isopropyl alcohol, followed by washes with water and hexane. 39.9 grams of product were obtained, indicating a yield of 68% by weight of theoretical. The compound had a melting point of 183°–186° C. and a mass spectrum molecular weight of 468. The IR and NMR spectra were consistent with the desired product. Calculated weight percents of the compound,

were 66.7% C, 6.89% H, 5.98% N, and 13.7% S. Test values were 66.4% C, 7.04% H, 5.97% N, and 13.6% S, respectively.

Procedure B.—Cyclohexylsulfenyl chloride (0.09 mole) was prepared in carbon tetrachloride as the solvent following the procedure in Procedure A. The HCl by-product was not removed. The solution was added to a slurry of 200 milliliters of tetrahydrofuran, 18.2 grams (0.18 mole) of triethylamine, and 9.6 grams (0.04 mole) of oxanilide over a period of 20 minutes. The slurry was stirred for 2 hours. A white product was filtered out and washed with water. The filtrate solution was concentrated to about 100 milliliters volume and 300 milliliters of hexane added. A white precipitate formed which was filtered out and washed with water. Total yield was 17.6 grams, 94% by weight of theoretical. A sample recrystallized from benzene had a melting point of 190°–193° C. The product was identified through its IR spectrum.

Procedure C.—Cyclohexylmercaptan, 10.2 grams (0.088 mole) were dissolved in 60 milliliters of trichloroethylene and chlorinated with 6.55 grams (0.092 mole) of chlorine gas. The solution was added over a period of 13 minutes to a slurry of 9.6 grams (0.04 mole) of oxanilide, 16.2 grams (0.16 mole) of triethylamine, and 200 milliliters of tetrahydrofuran. After stirring 3 hours, a white solid was filtered out and washed with water. The filtrate solution was dried down to a yellow solid. This was washed with hexane and water to a white color and added to the filtered solid. Total yield was near quantitative.

Example II

N,N'-bis(cyclohexylthio)oxamide was prepared following the procedure given in Procedure B, Example I. The solvent for the chlorination was heptane, and the organic liquid used was dimethylformamide. Oxamide was used in place of oxanilide. The product was dissolved in the dimethylformamide layer. This solution was separated out and admixed with diethyl ether. A white solid precipitated out which was isolated by filtration. The melting point of the compound was 160°–161° C. Mass spectra indicated a 316 molecular weight. Calculated weight percents for $C_{14}H_{24}N_2O_2S_2$ were 53.1% C, 7.64% H, and 8.85% N. Test values were 53.3% C, 7.88% H, and 8.77% N, respectively.

Example III

N,N'-bis(isopropylthio)oxanilide was prepared following the procedure in Procedure B, Example I. Heptane was the solvent used for the chlorination of isopropyl mercaptan, and tetrahydrofuran was used as the organic liquid for the product reaction. The reaction slurry was filtered to recover 62.0 grams of product, a yield of 32% by weight based upon a 0.5 mole recipe. The melting point of the compound was 145°–148° C. Calculated weight percents for the formula $C_{20}H_{24}N_2S_2O_2$ were 61.8% C, 6.22% H, and 7.20% N. Test values were 59.9% C, 6.22% H, and 7.04% N.

Example IV

N,N'-bis(phenylthio)oxanilide was prepared following the procedure in Example II. Benzenethiol was chlorinated to benzene sulfenyl chloride, which in turn was reacted with oxanilide. The product isolated was washed with water and acetone. Yield was 77.6 grams, 68% by weight of theoretical based on a 0.25 mole scale. The melting point was 202°–208° C. For the formula $C_{26}H_{20}N_2O_2S_2$, calculated weight percents were 68.4% C, 4.42% H, and 6.14% N. Test values were 68.8% C, 4.48% H, and 6.66% N, respectively.

Example V

The compounds prepared in Examples I to IV were evaluated as cure retarders in natural rubber (pale crepe). The rubber, activators, and fillers were premixed in a Banbury to form a uniform masterbatch. Portions of the masterbatch were admixed with the sulfur, accelerator, and other ingredients using a Brabender internal mixer. The following recipe was used (in parts by weight):

| | |
|---|---:|
| Natural rubber | 100 |
| HAF black (N330) | 50 |
| Zinc oxide | 5 |
| Stearic acid | 3 |
| Sulfur | 2.5 |
| OBTS [1] | 1.0 |
| Cure retarder | Variable |

[1] N-oxydiethylene benzothiazole-2-sulfenamide.

The cure ingredients were mixed at about 85° C. for about 5 minutes. The stock was then cured using a B.F.G. Cone Curometer operating at a temperature of 284° F. Measurements consisted of $T_s$, 2, the time for the stock to rise 2 units (inch-pound) over the minimum value, and $T_c$, the time required for the stock to reach 90% of its maximum torque value. After testing, all the stocks were visually checked for bloom on cured sheets. Included in the runs were three control samples having no cure retarder. The data from these three runs is averaged and reported as the control. The percent increase of $T_s$, 2 of the stocks over that of the control demonstrates the effectiveness of the novel compounds in delaying the onset of cure.

| | Control [1] | 1 | 2 | 3 | 4 | 5 | 6 | 7 | 8 | 9 |
|---|---|---|---|---|---|---|---|---|---|---|
| Recipe, parts | 161.5 | 161.5 | 161.5 | 161.5 | 161.5 | 161.5 | 161.5 | 161.5 | 161.5 | 161.5 |
| Cure retarder, parts: | | | | | | | | | | |
| BCTO | | 1.0 | | | | | | | | |
| BCTOM | | | 0.8 | 1.5 | 3.0 | | | | | |
| BIPTO | | | | | | 1.0 | 2.0 | 3.0 | | |
| BPTO | | | | | | | | | 0.45 | 0.65 |
| BFG cone curometer, 284° F.: | | | | | | | | | | |
| $T_s$, 2, minutes | 6.1 | 18.7 | 19.4 | 23.0 | 22.6 | 17.3 | 21.8 | 23.8 | 10.4 | 13.7 |
| $T_c$, minutes | 21.2 | 48.5 | 47.3 | 60.0 | 54.8 | 41.9 | 50.0 | 55.2 | 28.7 | 28.6 |
| Percent increase in $T_s$, 2 | | 206 | 218 | 277 | 270 | 184 | 258 | 290 | 71 | 125 |
| Bloom | None | (2) | None | None | None | None | None | None | Slight | Moderate |

[1] Average of three runs.
[2] Very slight.

NOTE.—BCTO=N,N'-bis(cyclohexylthio)oxanilide. BCTOM=N,N'-bis(cyclohexylthio)oxamide. BIPTO=N,N'-bis(isopropylthio)oxanilide. BPTO=N,N'-bis(phenylthio)oxanilide.

The data shows that the novel compounds are effective cure retarders. At a level of 1.0 part by weight, a 200% increase in scorch safety was readily obtained.

Example VI

N,N'-bis(cyclohexylthio)oxanilide was compared with a known cure retarder, sold commercially as Santogard PVI. The compounds were admixed with natural rubber following the procedure in Example V. Testing consisted of measuring $T_s$, 2, $T_c$, $T_5$ of Mooney scorch, visual bloom, and stress-strain and compression set properties of cure sheets. The recipes and data obtained are listed in the following table (in parts by weight).

| | Control [2] | 1 [3] | 2 [3] | 3 [3] | 4 [3] | 5 [3] | 6 | 7 [3] | 8 [3] | 9 [3] | 10 [3] | 11 | 12 |
|---|---|---|---|---|---|---|---|---|---|---|---|---|---|
| Natural rubber | 100 | 100 | 100 | 100 | 100 | 100 | 100 | 100 | 100 | 100 | 100 | 100 | 100 |
| HAF black (N330) | 50 | 50 | 50 | 50 | 50 | 50 | 50 | 50 | 50 | 50 | 50 | 50 | 50 |
| Zinc oxide | 5 | 5 | 5 | 5 | 5 | 5 | 5 | 5 | 5 | 5 | 5 | 5 | 5 |
| Stearic acid | 3 | 3 | 3 | 3 | 3 | 3 | 3 | 3 | 3 | 3 | 3 | 3 | 3 |
| Sulfur | 2.50 | 2.55 | 2.60 | 2.65 | 2.70 | 2.90 | 3.10 | 2.55 | 2.60 | 2.65 | 2.70 | 2.90 | 3.10 |
| OBTS | 1.0 | 1.0 | 1.0 | 1.0 | 1.0 | 1.0 | 1.0 | 1.0 | 1.0 | 1.0 | 1.0 | 1.0 | 1.0 |
| BCTO | | 0.25 | 0.50 | 0.75 | 1.00 | 2.00 | 3.00 | | | | | | |
| PVI [1] | | | | | | | | 0.25 | 0.50 | 0.75 | 1.00 | 2.00 | 3.00 |
| B.F.G. cone curometer, 284° F.: | | | | | | | | | | | | | |
| $T_s$, 2, minutes | 5.4 | 8.4 | 11.5 | 14.7 | 16.1 | 21.2 | 24.0 | 10.4 | 11.5 | 14.5 | 16.6 | 21.7 | 22.6 |
| $T_c$, minutes | 18.0 | 24.6 | 30.9 | 35.8 | 39.0 | 51.8 | 59.0 | 28.2 | 30.9 | 36.7 | 41.1 | 57.3 | 66.3 |
| Percent increase in $T_s$ | | 64 | 114 | 172 | 198 | 294 | 345 | 93 | 114 | 168 | 208 | 302 | 320 |
| Mooney viscurometer, 266° F.: $T_5$, minutes | 20.4 | 29.8 | 42.0 | 51.8 | 58.1 | 85.3 | 90.0 | 39.1 | 42.0 | 55.7 | 63.9 | 81.9 | 84.3 |
| Percent increase in $T_5$ | | 46 | 106 | 154 | 185 | 318 | 342 | 92 | 106 | 173 | 212 | 302 | 314 |
| Cured at 284° F.: | | | | | | | | | | | | | |
| Time, minutes | 18 | 25 | 32 | 36 | 40 | 52 | 59 | 29 | 32 | 37 | 42 | 58 | 67 |
| 300% modulus, p.s.i. | 2,340 | 2,280 | 2,340 | 2,220 | 2,200 | 2,250 | 1,700 | 2,290 | 2,340 | 2,260 | 1,990 | 1,810 | 2,210 |
| Tensile, p.s.i. | 3,800 | 3,390 | 4,090 | 3,210 | 3,200 | 3,990 | 2,230 | 3,490 | 4,090 | 4,210 | 2,920 | 2,460 | 4,080 |
| Elongation, percent | 470 | 410 | 490 | 400 | 390 | 510 | 370 | 420 | 490 | 520 | 400 | 370 | 510 |
| Compression set, percent: 22 hours at 212° F. | 70 | 72 | 69 | 67 | 76 | 77 | 72 | 69 | 65 | 69 | 66 | 71 | 82 |
| Bloom | N | VS | S | S | S | VS | N | N | S | M | M | S | H |

[1] N-(cyclohexylthio)phthalimide.
[2] Average of three runs, except for stress-strain and compression set—average of two runs.
[3] Average of two runs, except for stress-strain and compression set—one runs.
NOTE.—N=None. VS=Very slight. S=Slight. M=Moderate. H=Heavy.

The data show that BCTO delays the onset of cure as well as or better than the commercial cure retarder, PVI. Of particular importance is the fact that BCTO blooms much less at levels above 0.50 part per hundred. This results in a better appearing product and eliminates problems due to contamination.

Example VII

A particular problem arises when amine-based antioxidants and antiozonants are employed in recipes. These ingredients, added to stabilize the stock against degradation, make the stock more scorchy. Often known cure retarders fail to provide significant delay of cure in these situations. However, the novel retarders significantly increased the scorch safety of stocks employing these type of ingredients even when used at levels as low as 0.25 part per hundred.

| | 1 | 2 | 3 | 4 | 5 |
|---|---|---|---|---|---|
| Natural rubber (pale crepe) | 100 | 100 | 100 | | |
| SBR rubber [1] | | | | 100 | 100 |
| HAF black (N330) | 50 | 50 | 50 | 50 | 50 |
| Zinc oxide | 5 | 5 | 5 | 5 | 5 |
| Stearic acid | 3 | 3 | 3 | 3 | 3 |
| Anozite 67-F [2] | 2.0 | 2.0 | 2.0 | 2.0 | 2.0 |
| Sulfur | 2.50 | 2.50 | 2.55 | 2.50 | 2.60 |
| OBTS | 1.0 | 1.0 | 1.0 | 1.0 | 1.0 |
| BCTO [3] | | | 0.25 | | 0.50 |
| BFG cone curometer [4]: | | | | | |
| $T_s$, 2, minutes | 5.4 | 5.1 | 8.0 | 6.3 | 10.0 |
| $T_c$, minutes | 18.0 | 17.8 | 24.8 | 23.4 | 30.1 |
| Percent increase in $T_s$, 2 | | −5 | 57 | | 59 |
| Mooney viscometer [5]: $T_5$, minutes | 20.4 | 17.2 | 26.3 | 24.5 | 44.5 |
| Percent increase in $T_5$ | | −16 | 53 | | 82 |

[1] Ameripol 1007, hot polymerized SBR, 23.5% styrene.
[2] N-1,3-dimethylbutyl-N-phenyl-p-phenylenediamine.
[3] Data from control sample, Example VI.
[4] Samples 1,2,3 at 284° F.; samples 4,5 at 302° F.
[5] Samples 1,2,3 at 266° F.; samples 4,5 at 275° F.

Example VIII

The compound, N,N' - bis(cyclohexylthio)oxanilide (BCTO), was also evaluated as a vulcanization retarder in blends of natural rubber with styrene-butadiene rubber (Ameripol 1007) and cis-polybutadiene rubber (Ameripol CB-220). Particular problems arise in blends of rubbers as one type of rubber may be more scorchy than the other in a given cure system. Testing consisted of cone curometer and Mooney viscometer data, and stress-stain and compression set properties of cured sheets.

| | 1 | 2 | 3 | 4 |
|---|---|---|---|---|
| Natural rubber | 85 | 85 | 75 | 75 |
| SBR rubber | 15 | 15 | | |
| CB rubber | | | 25 | 25 |
| HAF black (N330) | 50 | 50 | 50 | 50 |
| Zinc oxide | 5 | 5 | 5 | 5 |
| Stearic acid | 3 | 3 | 3 | 3 |
| Anozite 67-F | 2.0 | 2.0 | 2.0 | 2.0 |
| Sulfur | 2.50 | 2.60 | 2.50 | 2.50 |
| OBTS | 1.0 | 1.0 | 1.0 | 1.0 |
| BCTO | | 0.50 | | 0.50 |
| BFG cone curometer [1]: | | | | |
| $T_s$, 2. minutes | 2.7 | 5.4 | 4.2 | 6.6 |
| $T_c$, minutes | 12.0 | 18.3 | 14.8 | 18.8 |
| Percent increase over $T_s$, 2 | | 100 | | 57 |
| Mooney viscometer, 275° F.: $T_5$, minutes | 16.0 | 28.0 | 13.7 | 19.5 |
| Percent increase over $T_5$ | | 75 | | 43 |
| Cured properties: | | | | |
| Time, minutes | 12 | 19 | 15 | 19 |
| 300% modulus, p.s.i. | 2,300 | 2,490 | 1,940 | 2,040 |
| Tensile, p.s.i. | 4,030 | 4,200 | 3,250 | 3,650 |
| Elongation, percent | 490 | 490 | 440 | 480 |
| Compression set,[2] percent: 22 hours at 212° F. | 58 | 58 | 59 | 60 |

[1] Samples 1 and 2 at 302° F.; samples 3 and 4 at 291° F.
[2] Cured 10 minutes longer than cure property time.

The data shows that BCTO provided much needed scorch safety to these blends, even when used at low levels. The properties of the delayed cured blends are actually slightly better than those not containing the cure retarder.

Example IX

Certain rubbers are extremely scorchy when using combinations of accelerators or when curing at elevated temperatures. The novel compounds provide much needed increased scorch safety in these stocks. BCTO was evaluated as a vulcanization retarder in the cure of an ethylene-propylene-diene polymer (Epcar 545, containing about 4% by weight 5-ethylidene - 2 - norbornene) and of an acrylonitrile-butadiene polymer (Hycar 1042), containing about 33% by weight of acrylonitrile).

The EPDM polymer was admixed with 80 parts of ISAFHM (N220) black, 50 parts of naphthenic processing oil, 5 parts zinc oxide, 1 part stearic acid, 1.50 parts of sulfur, 1.0 part tetramethylthiuram disulfide, and 0.5 part 2,2'-dibenzylthiazole disulfide. The $T_S$, 2 time at 320° F. was 1.3 minutes and the $T_5$ time at 293° F. 6.0 minutes, respectively. The addition of 0.50 part of N,N'-bis(cyclohexylthio)oxanilide, BCTO, to the stock increased $T_S$, 2 to 1.5 minutes (15%) and $T_5$ to 6.9 minutes (15%). Higher levels of BCTO would provide increased scorch safety.

The NBR polymer was admixed with 40 parts of FEF (N550) black, 5 parts zinc oxide, 1 part stearic acid, and 1 part of phenyl-β-naphthylamine antioxidant per 100 parts of rubber. The cure system used was 1.50 parts of sulfur and 1.0 part 2,2'-dibenzylthiazole disulfide. The $T_s$, 2 time at 320° F. was 1.8 minutes, and the $T_5$ time at 293° F. was 10.6 minutes. The addition of 0.50 part of BCTO increased the $T_s$, 2 time to 2.9 minutes (62%) and the $T_5$ time to 14.8 minutes (43%). When the commercial retarder, PVI, was added at 0.50 part by weight the increase was only 22% and 29%, respectively.

Example X

The novel compounds are quite useful in increasing the storage capacity of stocks by acting to delay cure. This is particularly useful in situations where part of a stock is worked on one day and the remainder stored for future use. The compounds also possess the ability to recover stocks. By recovery is meant that a stock already starting to cure can be interrupted in its cure by the addition of the novel compounds. This was demonstrated with a natural rubber stock. The stock was comprised of 100 parts natural rubber (pale crepe), 50 parts HAF (N330) black, 5 parts zinc oxide, 3 parts stearic acid, 2.5 parts sulfur, and 1.0 part OBTS. The stock was placed in a Brabender Plastograph, an internal mixer designed to record torque versus time. Mixing temperature was 145° C. (293° F.). The stock was mixed until the torque had risen 3 units over the minimum torque, indicating the onset of cure. At this point, 1.0 part of N,N'-bis(cyclohexylthio)oxanilide, BCTO, was added. The torque decreased to another minimum value and then again rose. The time required for the stock to rise 3 units over minimum value was measured. BCTO provided 13.3 minutes before the torque again increased 3 units over minimum. PVI in a similar run provided only 11.5 minutes of time.

The ability of the novel compounds to recover stocks fills a very practical need in the industry. Previously, stocks that were worked had to be scrapped if not needed or used at that moment. With the addition of these compounds, excess stock can be stored or re-worked later on, even if some cure had already started during the previous working.

I claim:

1. A composition having improved scorch safety comprising (a) a sulfur-vulcanizable polymer having from about 0.05% to 50% by weight based upon the weight of the polymer of olefinic unsaturation, (b) from about 0.05 part to about 7 parts by weight of an accelerator compound, (c) up to 10 parts by weight of elemental sulfur, and (d) from about 0.02 part to about 5 parts by weight of a (hydrocarbonthio) oxamide of the formula

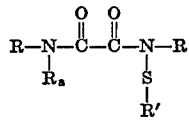

wherein R is hydrogen or is selected from the group consisting of alkyl, aryl, aralkyl, alkaryl, and cycloalkyl radicals containing 1 to 18 carbon atoms, $R_a$ is the same as R or is a —SR' radical, and R' is a hydrocarbon radical containing 1 to 18 carbon atoms selected from the group consisting of alkyl, aryl, aralkyl, alkaryl, and cycloalkyl radicals, the parts by weight of (b), (c), and (d) based upon 100 parts by weight of (a).

2. A composition of claim 1 wherein (a) is a sulfur-vulcanizable rubber or elastomer selected from the group consisting of natural rubber, cis-polyisoprene, cis-polybutadiene, emulsion polybutadiene, butadiene-acrylonitrile, isoprene-acrylonitrile, polyisobutylene, polychloroprene, butadiene-styrene, isoprene-styrene, isoprene-isobutylene, and ethylene-propylene-diene elastomers.

3. A composition of claim 2 wherein (b) is employed in a range from about 0.3 to about 5 parts by weight and is selected from the group consisting of dithiocarbamates, benzothiazoles, benzothiazole-sulfenamides, thiuram sulfides, thioureas, morpholines, polyamines, amine-aldehyde condensation products, imidazolines, and guanidines.

4. A composition of claim 3 wherein (d) is employed in a range from about 0.1 to about 3 parts by weight and wherein R is hydrogen or an aryl, aralkyl, or alkaryl radical containing 6 to 14 carbon atoms and $R_a$ is —SR'.

5. A composition of claim 4 wherein R is hydrogen or a phenyl radical, and R' is an alkyl or cycloalkyl radical containing 1 to 12 carbon atoms.

6. A composition of claim 5 wherein (b) is a benzothiazole-sulfenamide.

7. A composition of claim 5 wherein (d) is N,N'-bis(cyclohexylthio)oxamide.

8. A composition of claim 5 wherein (d) is N,N'-bis(cyclohexylthio)oxanilide.

9. A composition of claim 5 wherein (d) is N,N'-bis(isopropylthio)oxanilide.

10. A composition of claim 4 wherein (d) is N,N'-bis(phenylthio)oxanilide.

11. A method of improving the scorch safety of a sulfur-vulcanizable polymer having olefinic unsaturation and containing an accelerator compound and up to 10 parts by weight of elemental sulfur per hundred parts by weight of said polymer comprising the addition of from about 0.02 to about 5 parts by weight per hundred of polymer of a (hydrocarbonthio)oxamide of the formula

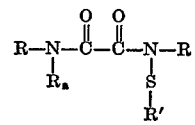

wherein R is hydrogen or is selected from the group consisting of alkyl, aryl, aralkyl, alkaryl, and cycloalkyl radicals containing 1 to 18 carbon atoms, $R_a$ is the same as R or is a —SR' radical, and R' is a hydrocarbon radical containing 1 to 18 carbon atoms selected from the group consisting of alkyl, aryl, aralkyl, alkaryl, and cycloalkyl radicals.

References Cited
UNITED STATES PATENTS
3,546,185   12/1970   Coran _____ 260—79.5

JOSEPH L. SCHOFER, Primary Examiner
C. A. HENDERSON, JR., Assistant Examiner

U.S. Cl. X.R.
260—79.5 B, 453, 780, 784, 785, 789, 790, 793, 794, 795